(12) United States Patent
Bajaj et al.

(10) Patent No.: US 8,503,428 B2
(45) Date of Patent: Aug. 6, 2013

(54) CUSTOMIZED CLASSIFICATION OF HOST BOUND TRAFFIC

(75) Inventors: Sandeep Bajaj, San Ramon, CA (US); Murtuza Attarwala, San Francisco, CA (US); Nitin Kumar, Fremont, CA (US); David Hahm, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 647 days.

(21) Appl. No.: 12/726,687

(22) Filed: Mar. 18, 2010

(65) Prior Publication Data
US 2011/0228793 A1 Sep. 22, 2011

(51) Int. Cl.
*H04L 12/28* (2006.01)

(52) U.S. Cl.
USPC .......................................... 370/351

(58) Field of Classification Search
None
See application file for complete search history.

(56) References Cited

U.S. PATENT DOCUMENTS

| | | | |
|---|---|---|---|
| 6,046,980 A * | 4/2000 | Packer | 370/230 |
| 6,205,119 B1 * | 3/2001 | Kaczynski | 370/231 |
| 6,285,658 B1 * | 9/2001 | Packer | 370/230 |
| 6,412,000 B1 * | 6/2002 | Riddle et al. | 709/224 |
| 6,496,516 B1 * | 12/2002 | Dabecki et al. | 370/460 |
| 6,584,101 B2 * | 6/2003 | Hagglund et al. | 370/389 |
| 6,760,775 B1 * | 7/2004 | Anerousis et al. | 709/238 |
| 6,901,048 B1 * | 5/2005 | Wang et al. | 370/228 |
| 7,296,288 B1 * | 11/2007 | Hill et al. | 726/2 |
| 7,467,225 B2 * | 12/2008 | Anerousis et al. | 709/238 |
| 7,551,623 B1 * | 6/2009 | Feroz et al. | 370/395.21 |
| 7,809,856 B2 * | 10/2010 | Skarpness | 709/240 |
| 7,872,993 B2 * | 1/2011 | Bailey et al. | 370/256 |
| 7,953,082 B2 * | 5/2011 | Cho et al. | 370/389 |
| 8,023,504 B2 * | 9/2011 | Shah et al. | 370/389 |
| 8,098,677 B1 * | 1/2012 | Pleshek et al. | 370/419 |
| 2001/0036161 A1 * | 11/2001 | Eidenschink et al. | 370/316 |
| 2002/0080804 A1 * | 6/2002 | Ando et al. | 370/401 |
| 2002/0110120 A1 * | 8/2002 | Hagglund et al. | 370/389 |
| 2003/0035385 A1 * | 2/2003 | Walsh et al. | 370/316 |
| 2003/0135691 A1 * | 7/2003 | Srinivasan | 711/108 |
| 2003/0142679 A1 * | 7/2003 | Okagawa et al. | 370/397 |
| 2004/0081093 A1 * | 4/2004 | Haddock et al. | 370/230 |
| 2004/0128434 A1 * | 7/2004 | Khanna et al. | 711/108 |
| 2004/0210670 A1 * | 10/2004 | Anerousis et al. | 709/238 |
| 2004/0233912 A1 * | 11/2004 | Droz et al. | 370/395.21 |
| 2005/0002405 A1 * | 1/2005 | Gao | 370/401 |
| 2005/0050060 A1 * | 3/2005 | Damm et al. | 707/100 |
| 2005/0144298 A1 * | 6/2005 | Samuel et al. | 709/230 |
| 2006/0092849 A1 * | 5/2006 | Santoso et al. | 370/244 |
| 2006/0117126 A1 * | 6/2006 | Leung et al. | 710/306 |
| 2006/0164980 A1 * | 7/2006 | Guru | 370/229 |
| 2006/0165103 A1 * | 7/2006 | Trudeau et al. | 370/401 |
| 2006/0239273 A1 * | 10/2006 | Buckman et al. | 370/395.41 |
| 2006/0264207 A1 * | 11/2006 | Tamura et al. | 455/415 |
| 2007/0008884 A1 * | 1/2007 | Tang | 370/230 |
| 2007/0195799 A1 * | 8/2007 | Kanazawa et al. | 370/401 |
| 2007/0273762 A1 * | 11/2007 | Steensma et al. | 348/143 |

(Continued)

*Primary Examiner* — Ayaz Sheikh
*Assistant Examiner* — Faiyazkhan Ghafoerkhan
(74) *Attorney, Agent, or Firm* — Harrity & Harrity, LLP

(57) ABSTRACT

A network device component receives traffic, determines whether the traffic is host bound traffic or non-host bound traffic, and classifies, based on a user-defined classification scheme, the traffic when the traffic is host bound traffic. The network device component also assigns, based on the classification, the classified host bound traffic to a queue associated with network device component for forwarding the classified host bound traffic to a host component of the network device.

20 Claims, 9 Drawing Sheets

(56) References Cited

U.S. PATENT DOCUMENTS

| | | | |
|---|---|---|---|
| 2008/0198866 A1* | 8/2008 | Shahar et al. | 370/412 |
| 2009/0144423 A1* | 6/2009 | Marr et al. | 709/226 |
| 2010/0031323 A1* | 2/2010 | Wiryaman et al. | 726/4 |
| 2010/0054241 A1* | 3/2010 | Shah et al. | 370/389 |

* cited by examiner

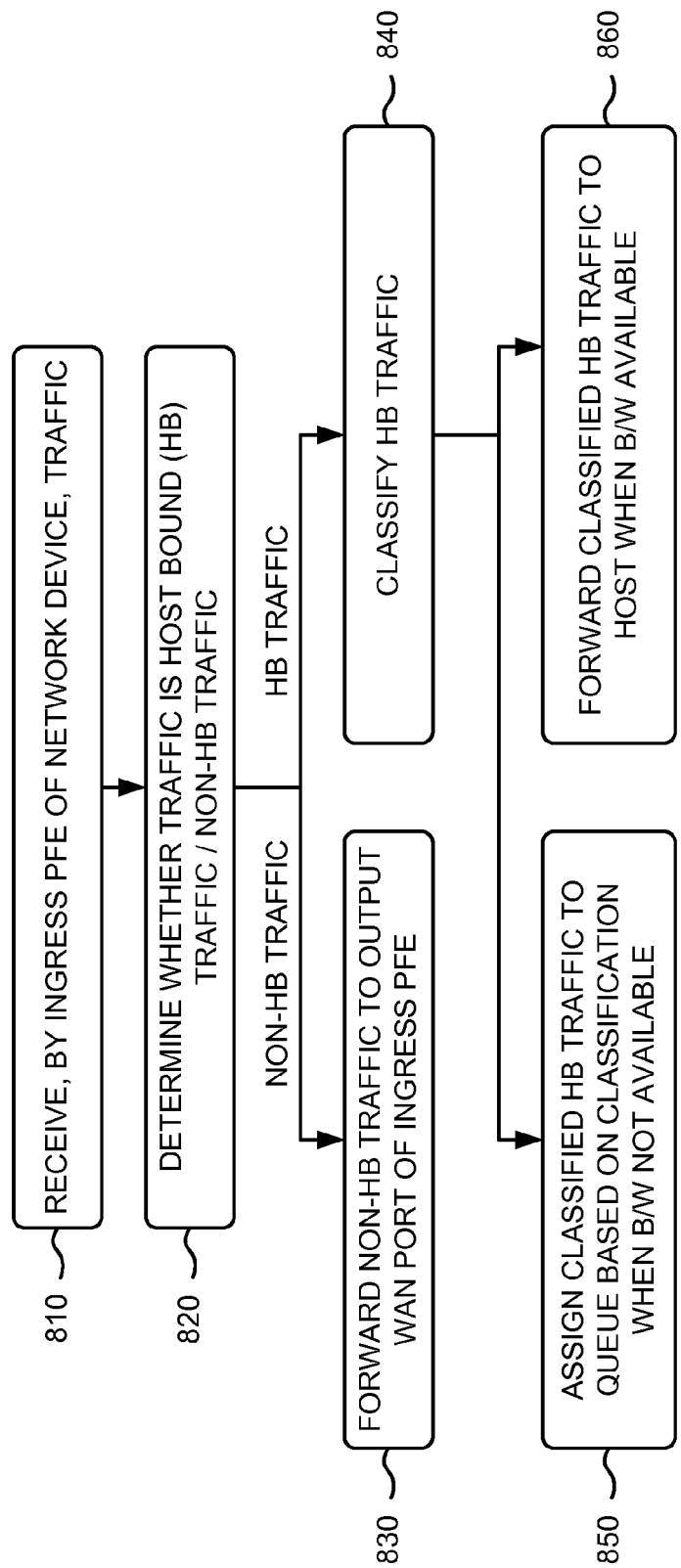

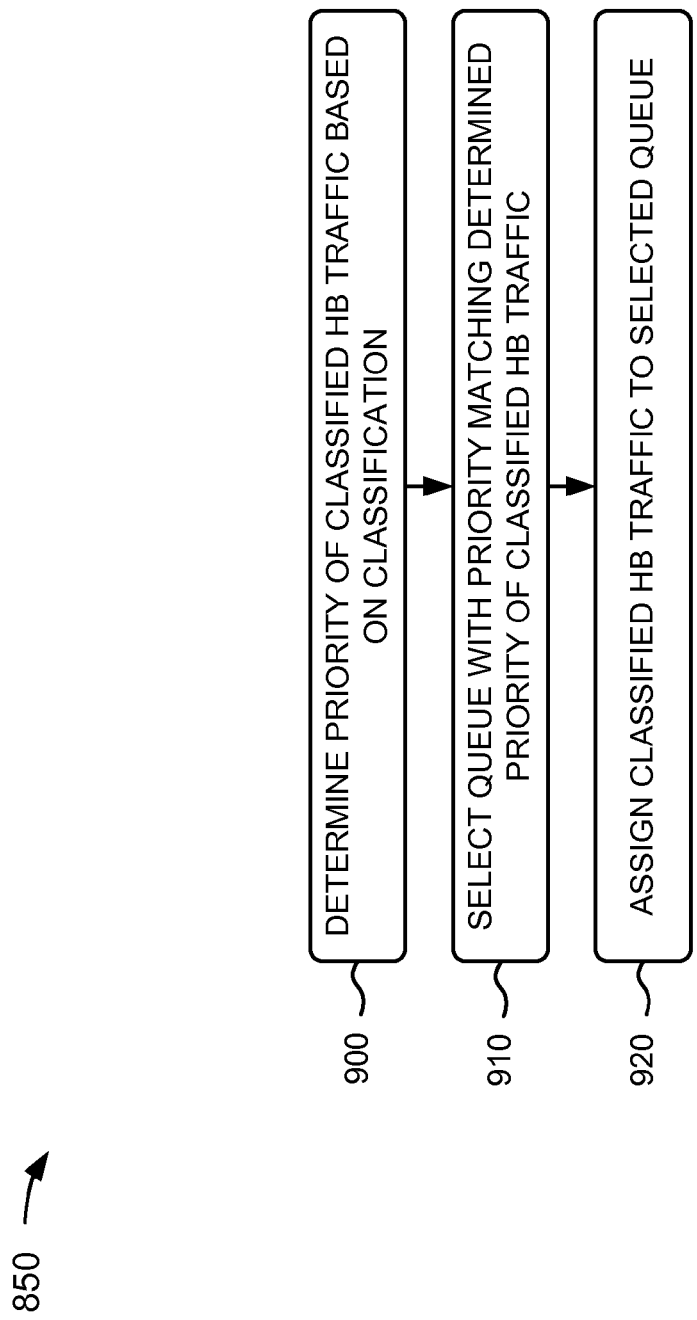

CUSTOMIZED CLASSIFICATION OF HOST BOUND TRAFFIC

BACKGROUND

Computing and communication networks typically include network devices, such as routers, firewalls, switches, or gateways, which transfer or switch data (or traffic), such as packets, from one or more sources to one or more destinations. Network devices may operate on the packets as the packets traverse the network, such as by forwarding or filtering the packet-based network traffic.

Network devices may also operate on host bound traffic, such as traffic provided to routing engines (e.g., hosts) of the network devices. For example, host bound traffic may include layer 2 (data link layer) traffic, layer 3 (network layer) traffic (e.g., according to the Open System Interconnection (OSI) model), protocol traffic, control traffic, etc. The data link layer provides functional and procedural means to transfer data between network devices and to detect and possibly correct errors that may occur in layer 1 (the physical layer). Network layer traffic provides functional and procedural means to transfer variable length data sequences from a source to a destination via one or more networks, while maintaining the quality of service requested by higher OSI layers.

A network device host (e.g., a routing engine) may have a limited bandwidth for handling host bound traffic. Mitigating congestion for host bound traffic (e.g., in the context of denial of service (DoS) attacks or sporadic packet burst) has been problematic since host interfaces in network device components (e.g., application-specific integrated circuits (ASICs)) have limited classification and queuing capabilities. For example, in some network devices there exist a fixed way (e.g., predetermined by the ASICs) to categorize traffic for different queues. Since this categorization is fixed, an undesirable outcome may occur, such as not enabling a customer (e.g., a network owner or user) to remove fate sharing for two different kinds of host bound traffic assigned to the same queue. In such a scenario, if one of the two kinds of host bound traffic experiences problems, the problematic traffic may over run the other traffic (e.g., which is not experiencing problems). When a customer experiences an issue related to loss of high-priority host bound traffic, a buffer-size of a queue (e.g., associated with the high-priority host bound traffic) may be increased. However, such an approach is ad-hoc and provides no configuration control to the customer.

SUMMARY

According to one aspect, a method may include receiving, by a network device component, traffic, and determining, by the network device component, whether the traffic is host bound traffic or non-host bound traffic. The method may also include classifying, by the network device component and based on a user-defined classification scheme, the traffic when the traffic is host bound traffic, and assigning, by the network device component and based on the classification, the classified host bound traffic to a queue associated with network device component when bandwidth is unavailable for forwarding the classified host bound traffic to a host component of the network device.

According to another aspect, a network device may include a host component, and a forwarding component that includes a memory configured to store a plurality of queues and a firewall filter. The firewall filter may receive traffic, may determine whether the traffic is host bound traffic or non-host bound traffic, may classify, based on a user-defined classification scheme, the traffic when the traffic is determined to be host bound traffic, and may allocate, based on the classification, the classified host bound traffic to one of the plurality of queues.

According to still another aspect, a forwarding component of a network device may include a memory configured to store a plurality of instructions and a plurality of queues. The forwarding component may also include a processor configured to execute instructions in the memory to receive traffic, and to determine whether the traffic is host bound traffic or non-host bound traffic. The processor may also execute instructions in the memory to forward the traffic to an output port of the forwarding component when the traffic is non-host bound traffic, and to classify, based on a user-defined classification scheme, the traffic when the traffic is host bound traffic. The processor may further execute instructions in the memory to assign, based on the classification, the classified host bound traffic to one of the plurality of queues, and to forward the classified host bound traffic to the host component when bandwidth is available for forwarding the classified host bound traffic to the host component.

BRIEF DESCRIPTION OF THE DRAWINGS

The accompanying drawings, which are incorporated in and constitute a part of this specification, illustrate one or more implementations described herein and, together with the description, explain these implementations. In the drawings:

FIGS. 8 and 9 are flow charts of a process for providing customized classification of host bound traffic according to implementations described herein.

DETAILED DESCRIPTION

The following detailed description refers to the accompanying drawings. The same reference numbers in different drawings may identify the same or similar elements. Also, the following detailed description does not limit the invention.

Implementations described herein may provide systems and/or methods that provide customized classification of host bound traffic. In one implementation, a network device may receive traffic, and may determine whether the traffic is host bound traffic or non-host bound traffic (e.g., a data packet to be forwarded by the network device). If the network device determines that the traffic is non-host bound traffic, the network device may forward the non-host bound traffic to a wide area network (WAN) port (e.g., for forwarding on by the network device). If the network device determines that the traffic is host bound traffic, the network device may classify the host bound traffic (e.g., according to a customer-defined classification scheme provided to the network device). The network device may assign the classified host bound traffic to a queue when bandwidth is unavailable for forwarding the host bound traffic to a host (e.g., a routing engine) associated with the network device. The network device may forward the classified host bound traffic to the host when bandwidth is available for forwarding the host bound traffic to the host.

The terms "component" and "device," as used herein, are intended to be broadly construed to include hardware (e.g., a processor, a microprocessor, an ASIC, field-programmable gate array (FPGA), a chip, a memory device (e.g., a read only memory (ROM), a random access memory (RAM), etc.), etc.) or a combination of hardware and software (e.g., a processor, microprocessor, ASIC, etc. executing software contained in a memory device).

The term "packet," as used herein, is intended to be broadly construed to include a frame, a datagram, a packet, or a cell; a fragment of a frame, a fragment of a datagram, a fragment of a packet, or a fragment of a cell; or another type, arrangement, or packaging of data.

Network Configuration

Figure 1:
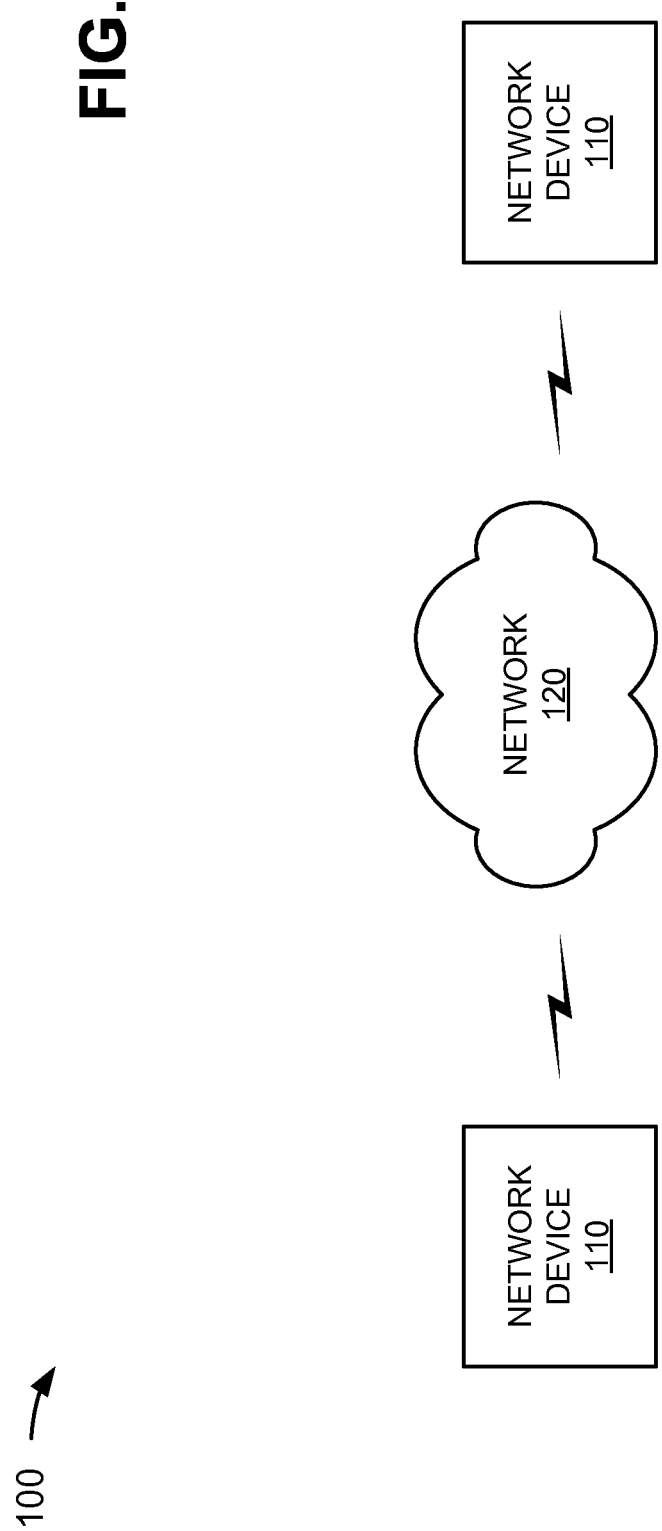
FIG. 1 is a diagram of an example of a network in which systems and/or methods described herein may be implemented.

FIG. 1 is a diagram of an example of a network 100 in which systems and/or methods described herein may be implemented. As illustrated, network 100 may include one or more network devices 110 interconnected by a network 120. Components of network 100 may interconnect via wired and/or wireless connections or links. Two network devices 110 and a single network 120 have been illustrated in FIG. 1 for simplicity. In practice, there may be more network devices 110 and/or networks 120. Also, in some instances, one or more of the components of network 100 may perform one or more tasks described as being performed by another one or more of the components of network 100.

Network device 110 may include a data transfer device, such as a gateway, a router, a switch, a firewall, a network interface card (NIC), a hub, a bridge, a proxy server, an optical add-drop multiplexer (OADM), or some other type of device that processes and/or transfers traffic. In an implementation, network device 110 may include a device that is capable of transmitting information to and/or receiving information from other network devices 110 via network 120.

Network 120 may include one or more networks of any type. For example, network 120 may include a local area network (LAN), a wide area network (WAN), a metropolitan area network (MAN), a telephone network (such as the Public Switched Telephone Network (PSTN), Public Land Mobile Network (PLMN), a wireless network), an intranet, the Internet, an optical fiber (or fiber optic)-based network, or a combination of networks.

Although FIG. 1 shows an example of components of network 100, in other implementations, network 100 may contain fewer components, different components, differently arranged components, or additional components than depicted in FIG. 1.

Network Device Configuration

Figure 2:
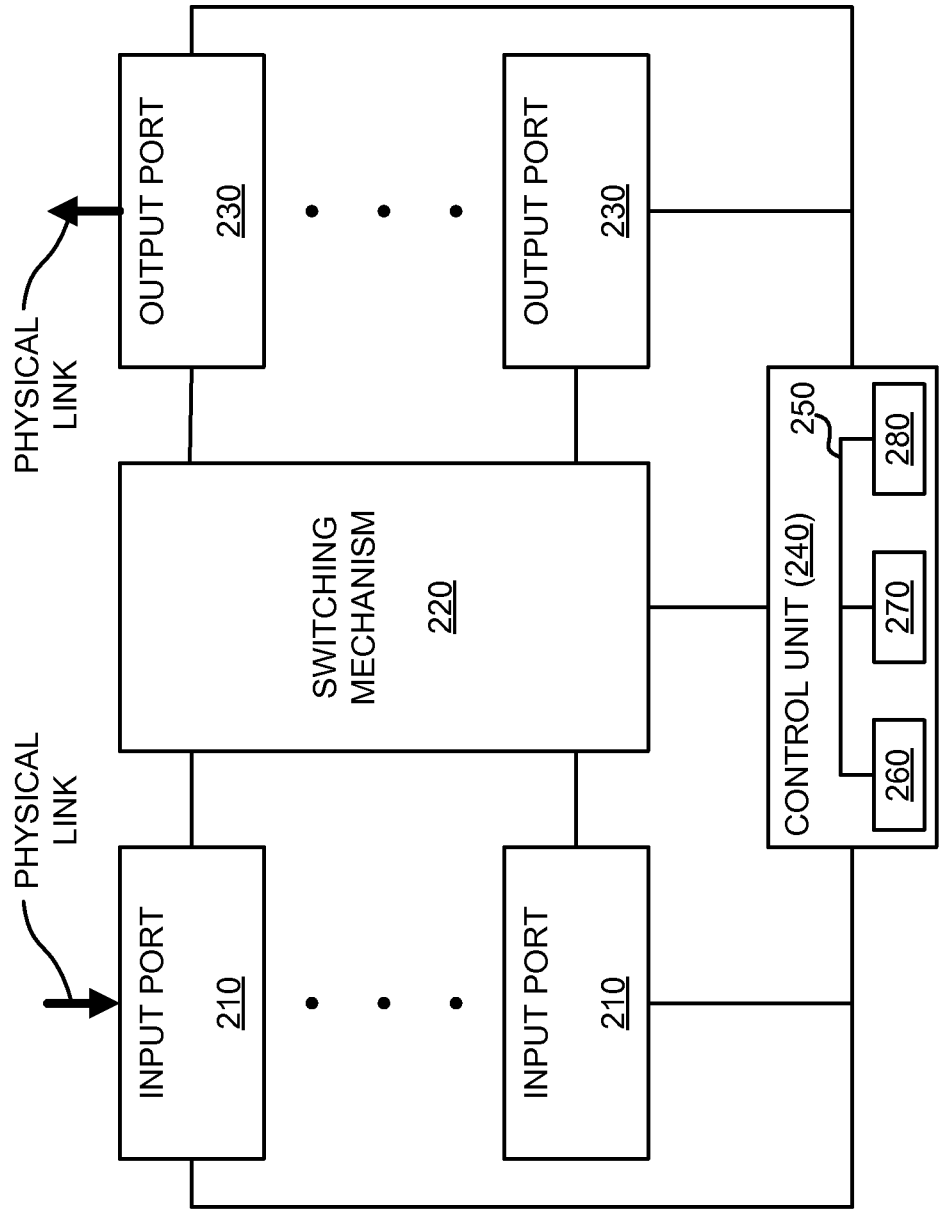
FIG. 2 is a diagram of components of a network device depicted in FIG. 1.

FIG. 2 illustrates a diagram of components of network device 110. As shown, network device 110 may include input ports 210, a switching mechanism 220, output ports 230, and a control unit 240.

Input ports 210 may be a point of attachment for a physical link and may be a point of entry for incoming traffic (e.g., packets). Input ports 210 may carry out data link layer encapsulation and decapsulation. Input ports 210 may look up a destination address of an incoming packet in a forwarding table to determine its destination port (i.e., route lookup). In one implementation, input ports 210 may send (e.g., may be an exit point) and/or receive (e.g., may be an entry point) packets.

Switching mechanism 220 may interconnect input ports 210 with output ports 230. Switching mechanism 220 may be implemented using many different techniques. For example, switching mechanism 220 may be implemented via busses, crossbars, and/or shared memories.

Output ports 230 may store packets and may schedule packets for service on an output link (e.g., a physical link) Output ports 230 may include scheduling algorithms that support priorities and guarantees. Output ports 230 may support data link layer encapsulation and decapsulation, and/or a variety of higher-level protocols. In one implementation, output ports 230 may send packets (e.g., may be an exit point) and/or receive packets (e.g., may be an entry point).

Control unit 240 may use routing protocols and one or more forwarding tables for forwarding packets. Control unit 240 may interconnect with input ports 210, switching mechanism 220, and output ports 230. Control unit 240 may compute a forwarding table, implement routing protocols, and/or run software to configure and manage network device 110.

In an implementation, control unit 240 may include a bus 250 that may include a path that permits communication among a processor 260, a memory 270, and a communication interface 280. Processor 260 may include one or more processors, microprocessors, ASICs, FPGAs, or other types of processing units that may interpret and execute instructions. Memory 270 may include a RAM, a ROM device, a magnetic and/or optical recording medium and its corresponding drive, and/or another type of static and/or dynamic storage device that may store information and instructions for execution by processor 260. Communication interface 280 may include any transceiver-like mechanism that enables control unit 240 to communicate with other devices and/or systems.

Network device 110 may perform certain operations, as described in detail below. Network device 110 may perform these operations in response to processor 260 executing software instructions contained in a computer-readable medium, such as memory 270. A computer-readable medium may be defined as a physical or logical memory device. A logical memory device may include memory space within a single physical memory device or spread across multiple physical memory devices. The software instructions may be read into memory 270 from another computer-readable medium, such as a data storage device, or from another device via communication interface 280. The software instructions contained in memory 270 may cause processor 260 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows an example of components of network device 110, in other implementations, network device 110 may contain fewer components, different components, differently arranged components, or additional components than depicted in FIG. 2. Alternatively, or additionally, one or more components of network device 110 may perform one or more other tasks described as being performed by one or more other components of network device 110.

Figure 3:
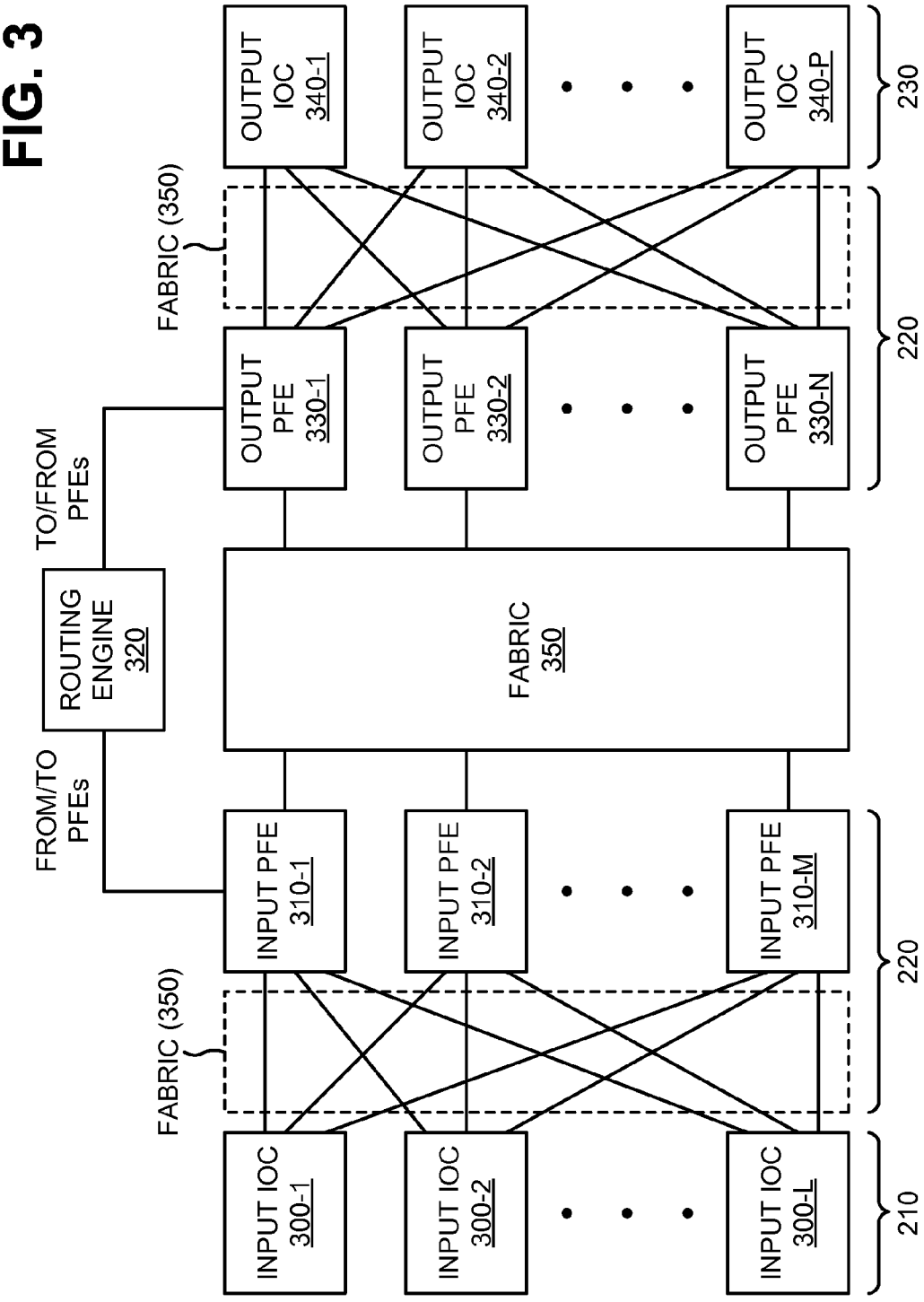
FIG. 3 is a diagram of further components of the network device.

FIG. 3 is a diagram of further components of network device 110. As illustrated, network device 110 may include a group of input input/output cards (IOCs) 300-1 through 300-L (collectively referred to as "input IOCs 300" and, in some instances, singularly as "input IOC 300"); a group of input PFEs 310-1 through 310-M (collectively referred to as "input PFEs 310" and, in some instances, singularly as "input PFE 310"); a routing engine 320, a group of output PFEs 330-1 through 330-N (collectively referred to as "output PFEs 330" and, in some instances, singularly as "output PFE 330"); a group of output IOCs 340-1 through 340-P (collectively referred to as "output IOCs 340" and, in some instances, singularly as "output IOC 340"); and fabrics 350. As further shown in FIG. 3, input IOCs 300 may correspond to input ports 210 (FIG. 2); input PFEs 310, output PFEs 330, and fabrics 350 may correspond to switching mechanism 220 (FIG. 2); and output IOCs 340 may correspond to output ports 230 (FIG. 2).

Input IOC 300 may include an input/output card that may be a point of attachment for a physical link and may be a point of entry for incoming packets to network device 110. As shown in FIG. 3, each of input IOCs 300 may interconnect with multiple input PFEs 310 (e.g., point-to-multipoint connections), via fabric 350. Input IOC 300 may include a variety of physical interfaces for receiving packets provided to network device 110. For example, input IOC 300 may include one or more Ethernet interfaces with small form-factor pluggable (SFP) connectors, one or more Ethernet interfaces with RJ-45 connectors, one or more Ethernet interfaces with XFP (e.g., 10 Gigabit SFP) connectors, and/or other interfaces.

Input PFE 310 may include a component that may process incoming traffic (e.g., received from input IOC 300) prior to transmitting the traffic to another PFE (e.g., output PFE 330) and/or to routing engine 320. Input PFE 310 may also perform route lookup for traffic, using forwarding tables, to determine destination information. If the destination information indicates that the traffic should be sent to another PFE (e.g., output PFE 330), then input PFE 310 may prepare the traffic for transmission to the other PFE, if necessary, and may send the traffic to the other PFE.

In one implementation, input PFE 310 may receive traffic, and may determine whether the traffic is host bound traffic (e.g., destined for routing engine 320) or non-host bound traffic (e.g., a data packet to be forwarded by network device 110). If input PFE 310 determines that the traffic is non-host bound traffic, input PFE 310 may forward the non-host bound traffic to a WAN port of input PFE 310 (e.g., for forwarding on to one of output PFEs 330). If input PFE 310 determines that the traffic is host bound traffic, input PFE 310 may classify the host bound traffic (e.g., according to a customer-defined classification scheme provided to network device 110). When bandwidth is unavailable for forwarding the host bound traffic to routing engine 320, input PFE 310 may assign the classified host bound traffic to a queue (e.g., provided in a memory of input PFE 310) based on the classification. Input PFE 310 may forward the classified host bound traffic to routing engine 320 when bandwidth is available for forwarding the host bound traffic to routing engine 320. Further details of input PFE 310 are provided below in connection with, for example, FIGS. 4-7.

Routing engine 320 may include a component that may perform high level management functions for network device 110. For example, routing engine 320 may communicate with other networks and network devices connected to network device 110 to exchange information regarding network topology. Routing engine 320 may create routing tables based on network topology information and forwarding tables based on the routing tables. Routing engine 320 may also perform other general control and monitoring functions for network device 110. In one implementation, routing engine 320 may receive host bound traffic from one or more PFEs 310 and/or 330.

Output PFE 330 may include a component that may process packets (e.g., received from input PFE 310) prior to transmitting the packets to a network (e.g., network 120). Output PFE 330 may also perform route lookup for packets, using forwarding tables, to determine destination information. If the destination information indicates that the packets should be sent out on a physical interface (e.g., one of output IOCs 340) connected to output PFE 330, then output PFE 330 may prepare the packets for transmission by, for example, adding any necessary headers, and may transmit the packets to one of output IOCs 340.

Fabric 350 may include a switching component that may allow efficient communication between input IOCs 300 and input PFEs 310, between PFEs 310 and 330, and between output PFEs 330 and output IOCs 340. For example, fabric 350 may include a hardwired non-blocking minimal spanning switch capable of connecting S inputs to S outputs in any combination.

Although FIG. 3 shows an example of components of network device 110, in other implementations, network device 110 may contain fewer components, different components, differently arranged components, or additional components than depicted in FIG. 3. Alternatively, or additionally, one or more components of network device 110 may perform one or more other tasks described as being performed by one or more other components of network device 110.

Figure 4:
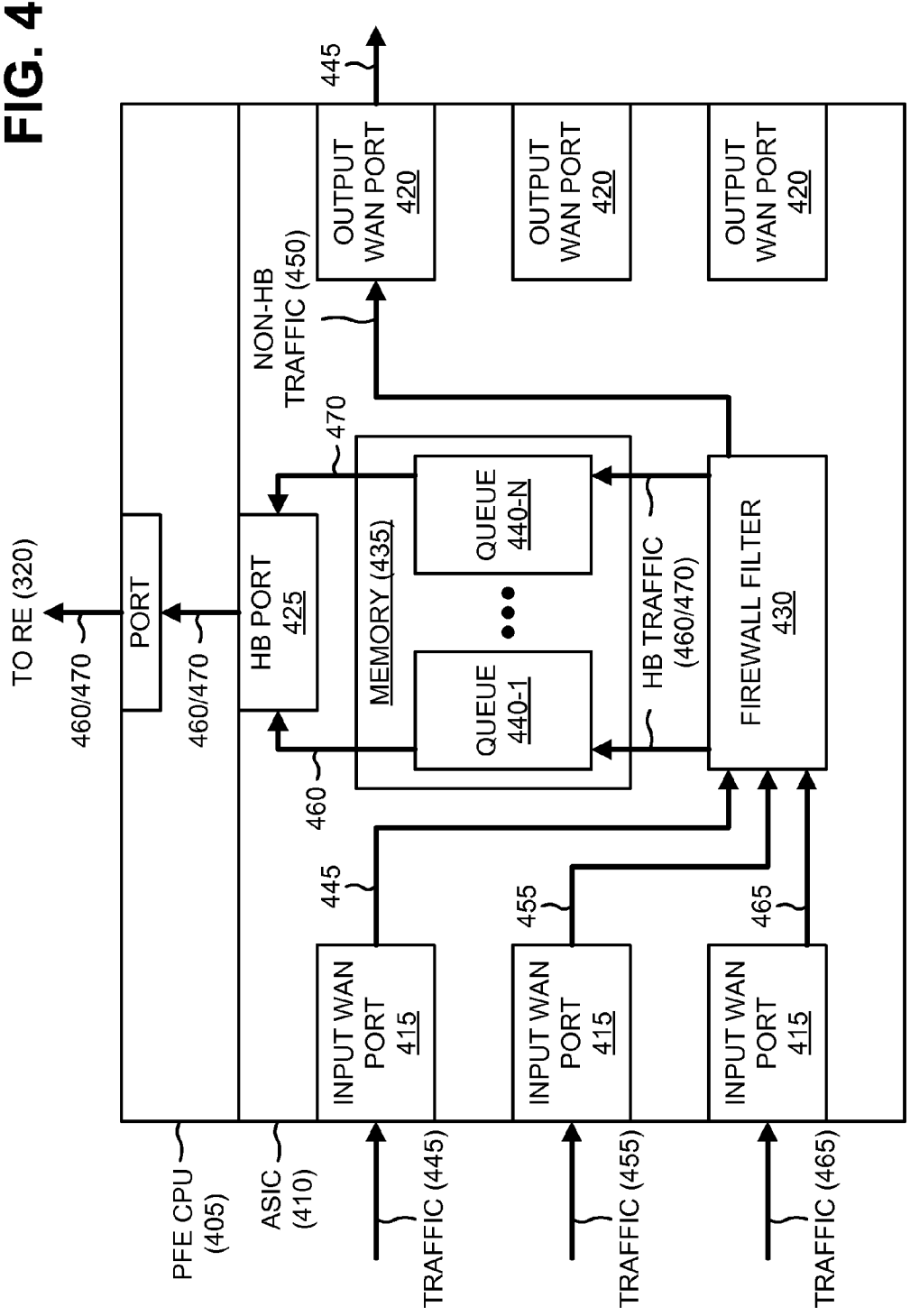
FIG. 4 is a diagram of components of one of the packet forwarding engines (PFEs) depicted in FIG. 3.

FIG. 4 is a diagram of components of one of input PFEs 310. As shown, input PFE 310 may include a PFE central processing unit (CPU) 405 and an ASIC 410. In one implementation, input PFE 310 may include multiple PFE CPU 405 and ASIC 410 combinations.

PFE CPU 405 may include one or more processors or microprocessors that interpret and execute instructions in order to perform the functions associated with input PFE 310 (e.g., process incoming packets prior to transmitting the packets, perform route lookup for packets, using forwarding tables, to determine destination information, etc.).

ASIC 410 may include an integrated circuit customized for a particular use, rather than intended for a general-purpose use. For example, ASIC 410 may include a chip designed to execute one or more operations of a component (e.g., PFE 310/330) provided in network device 110. As shown in FIG. 4, ASIC 410 may include input WAN ports 415, output WAN ports 420, a host bound (HB) port 425, a firewall filter 430, and a memory 435 (that includes queues 440-1 through 440-N; referred to collectively herein as "queues 440" and, in some instances, individually as "queue 440").

Input WAN ports 415 may be a point of entry for incoming traffic (e.g., packets). Input WAN ports 415 may carry out data link layer encapsulation and decapsulation. Input WAN ports 415 may look up a destination address of an incoming packet in a forwarding table (e.g., provided in memory 435) to determine its destination port (i.e., route lookup). In one implementation, input WAN ports 415 may send (e.g., may be an exit point) and/or receive (e.g., may be an entry point) packets.

Output WAN ports 420 may store packets and may schedule packets for output from input PFE 310. Output WAN ports 420 may include scheduling algorithms that support priorities and guarantees. Output WAN ports 420 may support data link layer encapsulation and decapsulation, and/or a variety of higher-level protocols. In one implementation, output WAN ports 420 may send packets (e.g., may be an exit point) and/or receive packets (e.g., may be an entry point).

Host bound port 425 may provide an output for host bound traffic (e.g., traffic provided to routing engine 320, layer 2 traffic, layer 3 traffic, protocol traffic, control traffic, etc.)

from input PFE 310 (e.g., via PFE CPU 405). In one implementation, host bound port 425 may send host bound traffic (e.g., may be an exit point) and/or receive host bound traffic (e.g., may be an entry point).

Firewall filter 430 may include a component that may be customized by a user of network device 110 to classify traffic a certain way. In one implementation, firewall filter 430 may receive traffic, and may determine whether the traffic is host bound traffic or non-host bound traffic (e.g., a data packet to be forwarded by input PFE 310). If firewall filter 430 determines that the traffic is non-host bound traffic, firewall filter 430 may forward the non-host bound traffic to one of output WAN ports 420 of input PFE 310 (e.g., for forwarding on by network device 110). If firewall filter 430 determines that the traffic is host bound traffic, firewall filter 430 may classify the host bound traffic (e.g., according to a customer-defined classification scheme provided to firewall filter 430). Firewall filter 430 may assign the classified host bound traffic to one of queues 440 (e.g., provided in memory 435) based on the classification and when bandwidth is unavailable for forwarding the host bound traffic to routing engine 320. Firewall filter 430 may forward the classified host bound traffic to routing engine 320 when bandwidth is available for forwarding the host bound traffic to routing engine 320.

Firewall filter 430 may provide input PFE 310 with a flexible way to assign different kinds of host bound traffic to different queues 440. In one implementation, a customer may change a definition(s) associated with firewall filter 430 in order to change a classification(s) of host bound traffic. This may enable the customer to prevent fate sharing between different kinds of host bound traffic. In another implementation, firewall filter 430 may be pre-configured to provide a default categorization of host bound traffic (e.g., via a default firewall filter definition(s)) so that similar host bound traffic may be stored in the same queue 440. For example, firewall filter 430 may be configured (e.g., by default or by the customer) to assign layer 2 high priority "keepalive" traffic to a particular one of queues 440 (e.g., queue 440-1) and to assign layer 3 high priority routing control traffic to another one of queues 440 (e.g., queue 440-2), etc. Further details of firewall filter 430 are provided below in connection with one or more of FIGS. 5-7.

Memory 435 may include a RAM or another type of dynamic storage device that stores information and instructions for execution by PFE CPU 405, a ROM or another type of static storage device that stores static information and instructions for PFE CPU 405, and/or some other type of magnetic or optical recording medium and its corresponding drive for storing information and/or instructions. In one implementation, memory 435 may store queues 440-1 through 440-N. Each of queues 440-1 through 440-N may include a data structure in which elements (e.g., host bound traffic) are removed in the same order they were entered (e.g., according to a first in, first out (FIFO) order). In one example, one or more of queues 440 may be associated with a particular classification of host bound traffic. If bandwidth is not available for forwarding host bound traffic to routing engine 320 (or routing engine 320 is otherwise not ready to receive host bound traffic), firewall filter 430 may store the host bound traffic in one of queues 440 until bandwidth becomes available. Further details of memory 435 and/or queues 440 are provided in connection with FIGS. 6 and 7.

As further shown in FIG. 4, one of input WAN ports 415 may receive traffic 445 and may forward traffic 445 to firewall filter 430. Firewall filter 430 may receive traffic 445, and may determine whether traffic 445 is host bound traffic or non-host bound traffic. If firewall filter 430 determines that traffic 445 is non-host bound traffic 450, firewall filter 430 may forward non-host bound traffic 450 to one of output WAN ports 420. Output WAN port 420 may, for example, forward non-host bound traffic 450 to one of output PFEs 330 (FIG. 3).

Another one of input WAN ports 415 may receive traffic 455 and may forward traffic 455 to firewall filter 430. Firewall filter 430 may receive traffic 455, and may determine whether traffic 455 is host bound traffic or non-host bound traffic. If firewall filter 430 determines that traffic 455 is host bound traffic 460, firewall filter 430 may classify host bound traffic 460. Firewall filter 430 may assign the classified host bound traffic 460 to one of queues 440 (e.g., queue 440-1) based on the classification and when bandwidth is unavailable for forwarding host bound traffic 460 to routing engine 320. Queue 440-1 may store host bound traffic 460 until bandwidth becomes available for forwarding host bound traffic 460 to routing engine 320. When bandwidth becomes available, queue 440-1 may forward host bound traffic 460 to host bound port 425, and host bound port 425 may forward host bound traffic 460 to routing engine 320 (e.g., via a port associated with PFE CPU 405).

Still another one of input WAN ports 415 may receive traffic 465 and may forward traffic 465 to firewall filter 430. Firewall filter 430 may receive traffic 465, and may determine whether traffic 465 is host bound traffic or non-host bound traffic. If firewall filter 430 determines that traffic 465 is host bound traffic 470, firewall filter 430 may classify host bound traffic 470. In one example, firewall filter 430 may forward the classified host bound traffic 470 to host bound port 425 (e.g. for forwarding to routing engine 320) when bandwidth is available for forwarding host bound traffic 470 to routing engine 320. In another example, firewall filter 430 may assign the classified host bound traffic 470 to one of queues 440 (e.g., queue 440-N) based on the classification and when bandwidth is unavailable for forwarding host bound traffic 470 to routing engine 320. Queue 440-N may store host bound traffic 470 until bandwidth becomes available for forwarding host bound traffic 470 to routing engine 320. When bandwidth becomes available, queue 440-N may forward host bound traffic 470 to host bound port 425, and host bound port 425 may forward host bound traffic 470 to routing engine 320 (e.g., via the port associated with PFE CPU 405).

In one implementation, each of queues 440 may be assigned a priority based on the host bound traffic classified for a particular queue. For example, queue 440-1 may be assigned a first priority, queue 440-2 may assigned a second priority (e.g., which is lower than the first priority), . . . , and queue 440-N may assigned an Nth priority (e.g., which is a last priority). When bandwidth becomes available for forwarding host bound traffic to routing engine 320, host bound traffic provided in the highest priority queue 440 may be forwarded first, then host bound traffic in a next highest priority queue 440 may be forwarded, and so on. For example, with reference to FIG. 4, when bandwidth becomes available for forwarding host bound traffic to routing engine 320, host bound traffic 460 may be forwarded from queue 440-1 before host bound traffic 470 is forwarded from queue 440-N. Such an arrangement may ensure that higher priority host bound traffic is provided to routing engine 320 before lower priority host bound traffic.

Although FIG. 4 shows an example of components of input PFE 310, in other implementations, input PFE 310 may contain fewer components, different components, differently arranged components, or additional components than depicted in FIG. 4. Alternatively, or additionally, one or more components of input PFE 310 may perform one or more other tasks described as being performed by one or more other components of input PFE 310.

Figure 5:
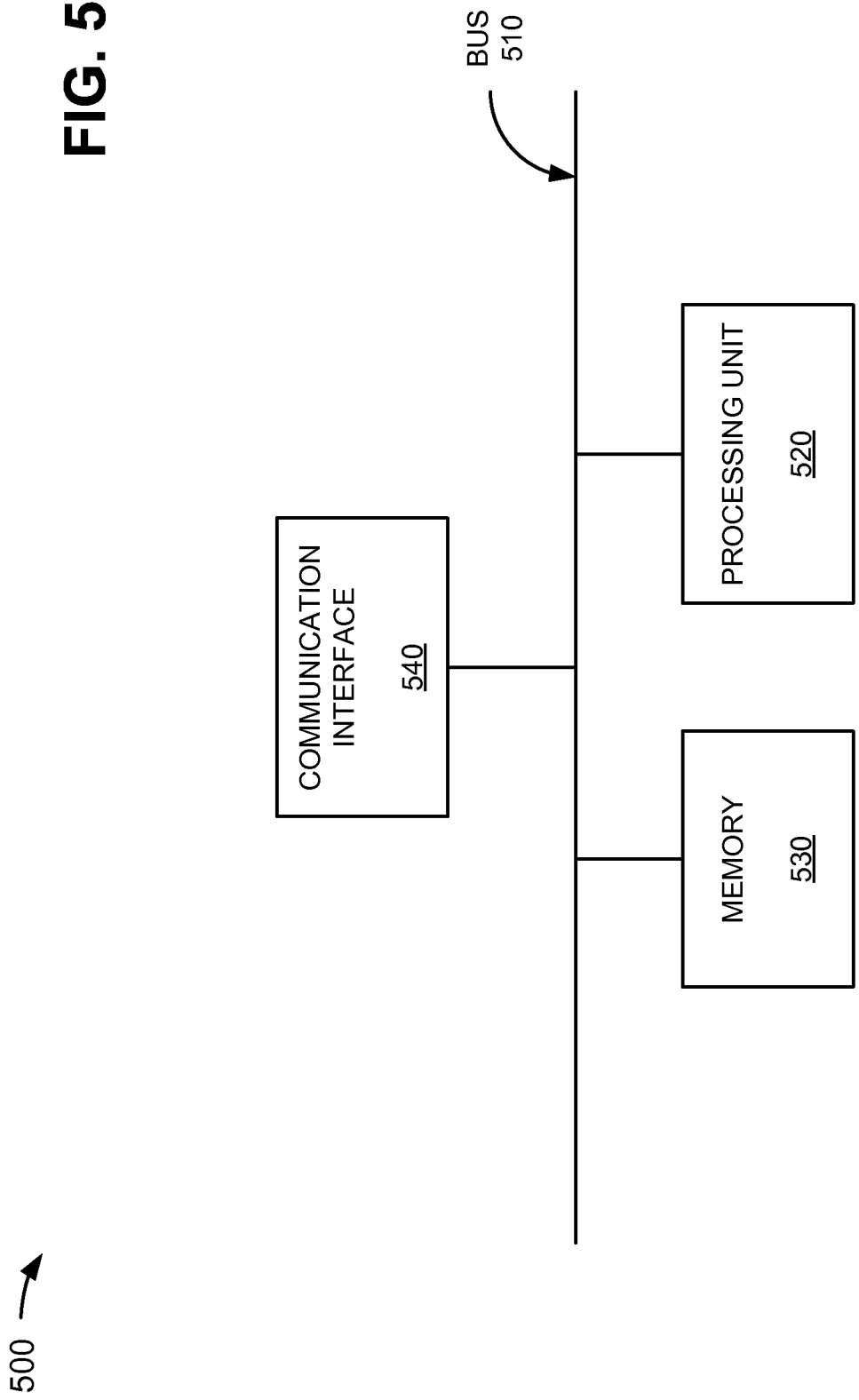
FIG. 5 is a diagram of a portion of one of the components depicted in FIG. 4.

FIG. 5 is a diagram of a portion 500 of one of the components (e.g., PFE CPU 405, ASIC 410, etc.) of input PFE 310 (FIG. 4). As shown, portion 500 may include a bus 510, a processing unit 520, a memory 530, and a communication interface 540.

Bus 510 may permit communication among portion 500 of input PFE 310 component. Processing unit 520 may include one or more processors or microprocessors that interpret and execute instructions.

Memory 530 may include a RAM or another type of dynamic storage device that stores information and instructions for execution by processing unit 520, a ROM or another type of static storage device that stores static information and instructions for the processing unit 520, and/or some other type of magnetic or optical recording medium and its corresponding drive for storing information and/or instructions.

Communication interface 540 may include any transceiver-like mechanism that enables input PFE 310 component to communicate with other components, devices, and/or systems.

As described herein, input PFE 310 component may perform certain operations in response to processing unit 520 executing software instructions contained in a computer-readable medium, such as memory 530. The software instructions may be read into memory 530 from another computer-readable medium or from another device via communication interface 560. The software instructions contained in memory 530 may cause processing unit 520 to perform processes described herein. Alternatively, hardwired circuitry may be used in place of or in combination with software instructions to implement processes described herein. Thus, implementations described herein are not limited to any specific combination of hardware circuitry and software.

Firewall Filter Configuration

Figure 6:
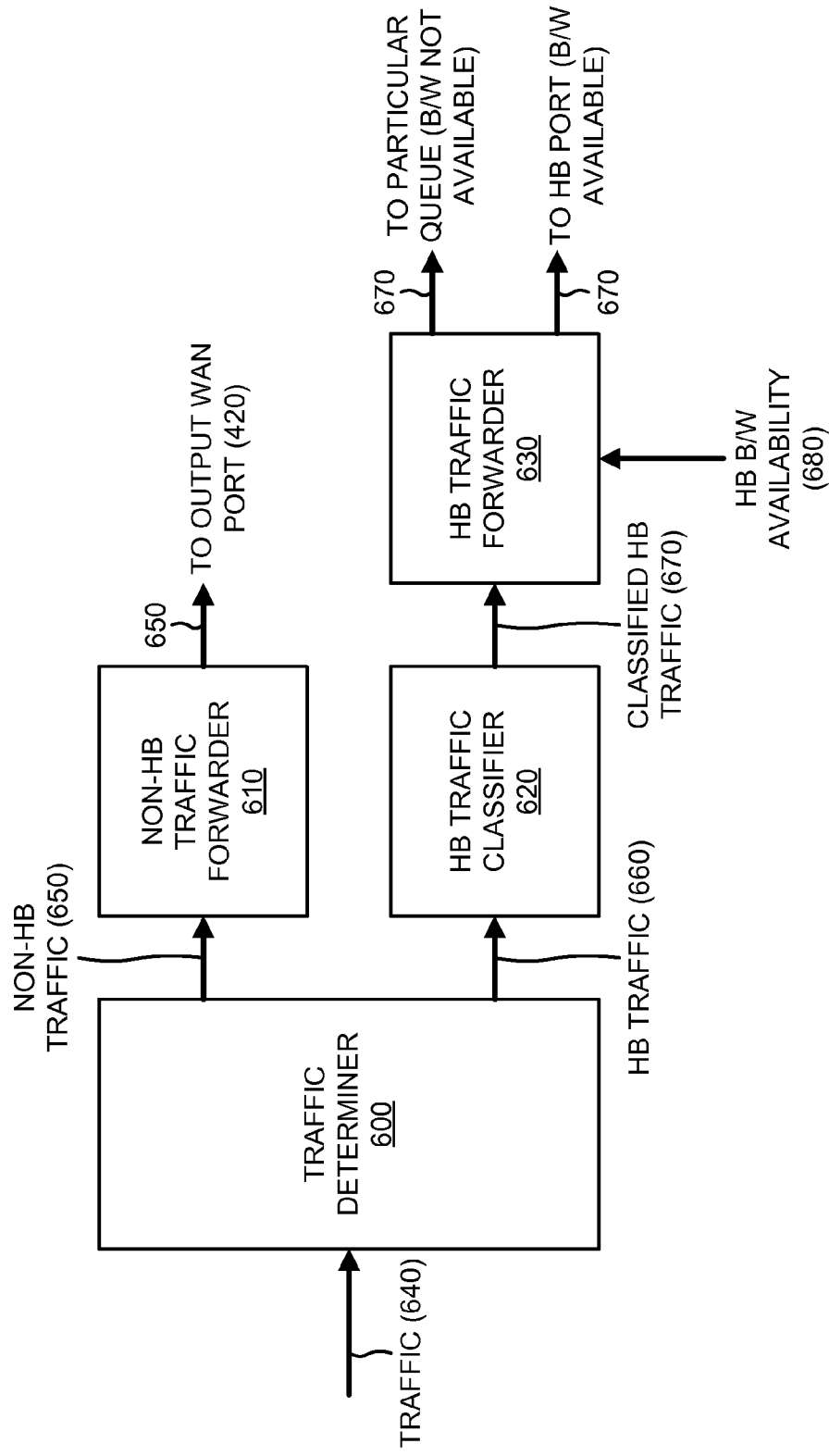
FIG. 6 is a diagram of functional components of a firewall filter depicted in FIG. 4.

FIG. 6 is a diagram of functional components of firewall filter 430. In one example, the functional components described in connection with FIG. 6 may be implemented by one or more of the components depicted in FIG. 5. As shown, firewall filter 430 may include a traffic determiner 600, a non-host bound traffic forwarder 610, a host bound traffic classifier 620, and a host bound traffic forwarder 630.

Traffic determiner 600 may include hardware or a combination of hardware and software that may receive traffic 640, and may determine whether traffic 640 is non-host bound traffic 650 or host bound traffic 660. Traffic determiner 600 may provide non-host bound traffic 650 to non-host bound traffic forwarder 610, and may provide host bound traffic 660 to host bound traffic classifier 620.

Non-host bound traffic forwarder 610 may include hardware or a combination of hardware and software that may receive non-host bound traffic 650 from traffic determiner 600, and may forward non-host bound traffic 650 to one of output WAN ports 420 of input PFE 310.

Host bound traffic classifier 620 may include hardware or a combination of hardware and software that may receive host bound traffic 660 from traffic determiner 620, and may classify host bound traffic 660. Host bound traffic classifier 620 may forward classified host bound traffic 670 to host bound traffic forwarder 630.

Host bound traffic forwarder 630 may include hardware or a combination of hardware and software that may receive classified host bound traffic 670 from host bound traffic classifier 620, and may receive a bandwidth availability 680 associated with forwarding host bound traffic to routing engine 320. Bandwidth availability 680 may include a processing load at routing engine 320, memory constraints of routing engine 320, or anything else indicating that a delay is desirable before sending information to routing engine. Host bound traffic forwarder 630 may assign classified host bound traffic 670 to one of queues 440 based on the classification and when bandwidth is unavailable (e.g., as indicated by bandwidth availability 680) for forwarding classified host bound traffic 670 to routing engine 320. Host bound traffic forwarder 630 may forward classified host bound traffic 670 to host bound port 425 when bandwidth is available (e.g., as indicated by bandwidth availability 680) for forwarding classified host bound traffic 670 to routing engine 320. Host bound port 425 may forward classified host bound traffic 670 to routing engine 320 (e.g., via the port associated with PFE CPU 405).

In one implementation, host bound traffic forwarder 630 may determine a priority of classified host bound traffic 670 based on the classification, and may determine one of queues 440 with a priority matching the determined priority of classified host bound traffic 670. Host bound traffic forwarder 630 may assign classified host bound traffic 670 to the determined queue 440 when bandwidth is unavailable (e.g., as indicated by bandwidth availability 680) for forwarding classified host bound traffic 670 to routing engine 320.

Although FIG. 6 shows an example of functional components of firewall filter 430, in other implementations, firewall filter 430 may contain fewer functional components, different functional components, differently arranged functional components, or additional functional components than depicted in FIG. 6. Alternatively, or additionally, one or more functional components of firewall filter 430 may perform one or more other tasks described as being performed by one or more other functional components of firewall filter 430.

Memory Configuration

Figure 7:
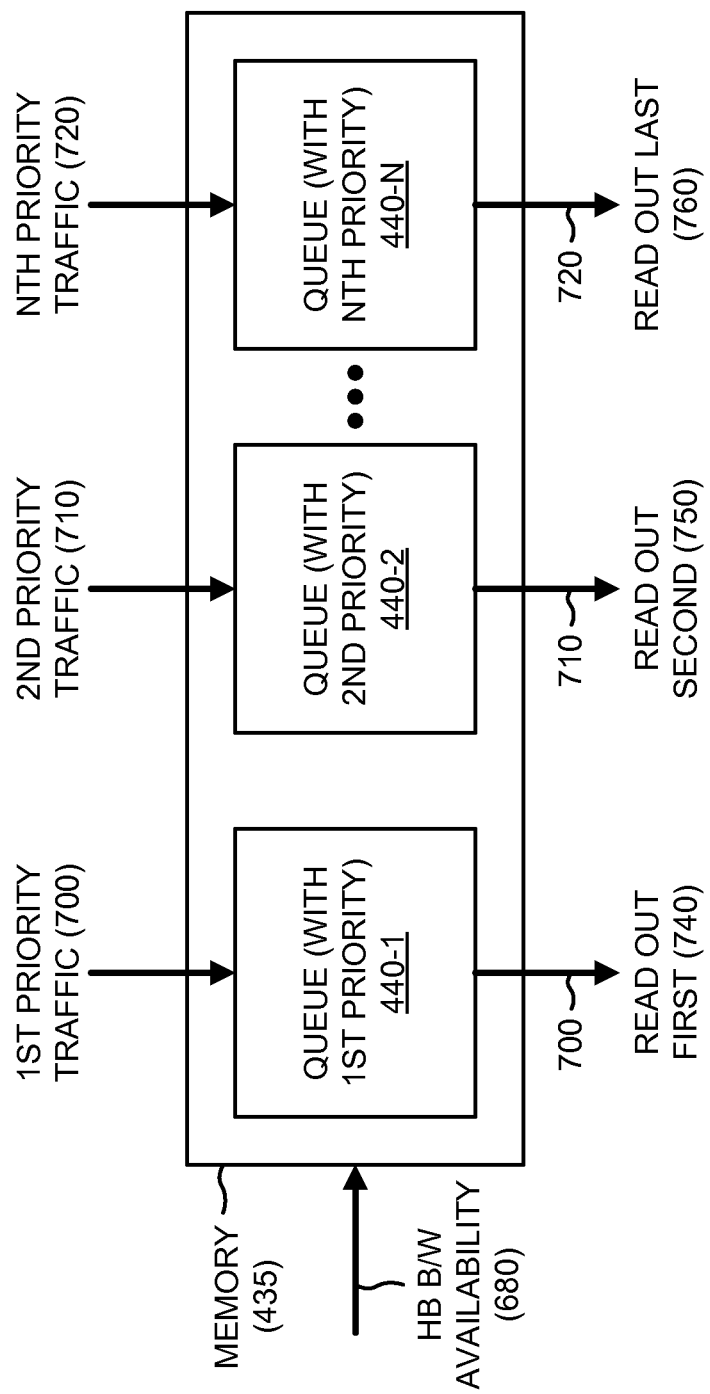
FIG. 7 is a diagram of components of a memory depicted in FIG. 4.

FIG. 7 is a diagram of components of memory 435. As shown, memory 435 may include queues 440-1, 440-2, . . . , 440-N. Queues 440-1, 440-2, . . . , 440-N may include the features described above in connection with one or more of FIGS. 4 and 6.

As further shown in FIG. 7, each of queues 440 may be assigned a priority based on host bound traffic classified for a particular queue. For example, queue 440-1 may be assigned a first priority, queue 440-2 may assigned a second priority (e.g., which is lower than the first priority), . . . , and queue 440-N may assigned an Nth priority (e.g., which is a last priority). In other implementations, one or more of queues 440 may be assigned the same priority, different priorities, etc. Queue 440-1 may receive first priority host bound traffic 700 (e.g., layer 2 high priority "keepalive" traffic), queue 440-2 may receive second priority host bound traffic 710 (e.g., layer 3 high priority routing control traffic), and queue 440-N may receive Nth priority host bound traffic 720. It may be assumed for this example that first priority traffic 700 have a higher priority than second priority traffic 710 and Nth priority traffic 720, and that second priority traffic 710 have a higher priority than Nth priority traffic 720.

Memory 435 may receive bandwidth availability 680 associated with forwarding host bound traffic to routing engine 320. When bandwidth becomes available for forwarding host bound traffic to routing engine 320 (e.g., as indicated by bandwidth availability 680), host bound traffic provided in the highest priority queue 440 may be forwarded first, then host bound traffic in a next highest priority queue 440 may be forwarded, and so on. For example, with reference to FIG. 7, when bandwidth becomes available for forwarding host bound traffic to routing engine 320 (e.g., as indicated by bandwidth availability 680), first priority host bound traffic 700 may be forwarded from queue 440-1 before second priority host bound traffic 710 are forwarded from queue 440-2. Second priority host bound traffic 710 may be forwarded from queue 440-2 before Nth priority host bound traffic 720 are forwarded from queue 440-N. Such an arrangement may ensure that higher priority host bound traffic is provided to routing engine 320 before lower priority host bound traffic.

Although FIG. 7 shows an example of components of memory 435, in other implementations, memory 435 may contain fewer components, different components, differently arranged components, or additional components than depicted in FIG. 7. Alternatively, or additionally, one or more components of memory 435 may perform one or more other tasks described as being performed by one or more other components of memory 435.

Process Example

FIGS. 8 and 9 are flow charts of a process 800 for providing customized classification of host bound traffic according to implementations described herein. In one implementation, process 800 may be performed by one or more components of input PFE 310 (FIG. 4). In another implementation, some or all of process 800 may be performed by network device 110.

As illustrated in FIG. 8, process 800 may include receiving, by an ingress PFE of a network device, traffic (block 810), and determining whether the traffic is host bound traffic or non-host bound traffic (block 820). For example, in implementations described above in connection with FIG. 4, one of input WAN ports 415 may receive traffic 445 and may forward traffic 445 to firewall filter 430. Firewall filter 430 may receive traffic 445, and may determine whether traffic 445 is host bound traffic or non-host bound traffic.

As further shown in FIG. 8, if the traffic is non-host bound traffic (block 820—"NON-HB TRAFFIC"), process 800 may include forwarding the non-host bound traffic to an output WAN port of the ingress PFE or to another PFE (block 830). For example, in implementations described above in connection with FIG. 4, if firewall filter 430 determines that traffic 445 is non-host bound traffic 450, firewall filter 430 may forward non-host bound traffic 450 to one of output WAN ports 420. Output WAN port 420 may, for example, forward non-host bound traffic 450 to one of output PFEs 330.

Returning to FIG. 8, if the traffic is host bound traffic (block 820—"HB TRAFFIC"), process 800 may include classifying the host bound traffic (block 840), assigning the classified host bound traffic to a queue based on the classification and when bandwidth is not available (block 850), and forwarding the classified host bound traffic to the host when bandwidth is available (block 860). For example, in implementations described above in connection with FIG. 4, firewall filter 430 may forward the classified host bound traffic 470 to host bound port 425 (e.g. for forwarding to routing engine 320) when bandwidth is available for forwarding host bound traffic 470 to routing engine 320. Firewall filter 430 may assign the classified host bound traffic 470 to one of queues 440 (e.g., queue 440-N) based on the classification and when bandwidth is unavailable for forwarding host bound traffic 470 to routing engine 320. When bandwidth becomes available, queue 440-N may forward host bound traffic 470 to host bound port 425, and host bound port 425 may forward host bound traffic 470 to routing engine 320 (e.g., via the port associated with PFE CPU 405).

Process block 850 may include the process blocks depicted in FIG. 9. As shown in FIG. 9, process block 850 may include determining a priority of the classified host bound traffic based on the classification (block 900), selecting a queue with a priority matching the determined priority of the classified host bound traffic (block 910), and assigning the classified host bound traffic to the selected queue (block 920). For example, in implementations described above in connection with FIG. 6, host bound traffic forwarder 630 of firewall filter 430 may determine a priority of classified host bound traffic 670 based on the classification, and may determine one of queues 440 with a priority matching the determined priority of classified host bound traffic 670. Host bound traffic forwarder 630 may assign classified host bound traffic 670 to the determined queue 440 when bandwidth is unavailable (e.g., as indicated by bandwidth availability 680) for forwarding classified host bound traffic 670 to routing engine 320.

CONCLUSION

Implementations described herein may provide systems and/or methods that provide customized classification of host bound traffic. In one implementation, a network device may receive traffic, and may determine whether the traffic is host bound traffic or non-host bound traffic. If the network device determines that the traffic is non-host bound traffic, the network device may forward the non-host bound traffic to a WAN port (e.g., for forwarding on by the network device). If the network device determines that the traffic is host bound traffic, the network device may classify the host bound traffic (e.g., according to a customer-defined classification scheme provided to the network device). The network device may assign the classified host bound traffic to a queue when bandwidth is unavailable for forwarding the host bound traffic to a host (e.g., a routing engine) associated with the network device. The network device may forward the classified host bound traffic to the host when bandwidth is available for forwarding the host bound traffic to the host.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8 and 9, the order of the blocks may be modified in other implementations. Further, non-dependent blocks may be performed in parallel.

It will be apparent that aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code—it being understood that software and control hardware could be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   receiving, by a network device, traffic;
   determining, by the network device, whether the traffic is host bound traffic or non-host bound traffic;
   determining, by the network device and based on a classification scheme defined by a user of the network device, a classification of the traffic when the traffic is host bound traffic;
   determining, by the network device and when the traffic is host bound traffic, that a bandwidth is unavailable for forwarding the traffic to a host component of the network device;
   assigning, by the network device and based on the classification, the traffic to a queue associated with the network device based on determining that the bandwidth is unavailable for forwarding the traffic to the host component;
   determining, by the network device, that a different bandwidth is available for forwarding different traffic to the host component; and
   forwarding, by the network device, the different traffic to the host component, without assigning the different traffic to any queue, based on determining that the different bandwidth is available for forwarding the different traffic to the host component.

2. The method of claim 1, further comprising:
   forwarding the traffic to an output port associated with the network device when the traffic is non-host bound traffic.

3. The method of claim 1, where assigning the traffic includes:
   determining a priority of the traffic based on the classification;
   selecting the queue, from a plurality of queues, based on the priority of the traffic; and
   assigning the traffic to the queue.

4. The method of claim 1, where the network device includes one or more of:
   a gateway,
   a switch,
   a network interface card (NIC),
   a hub,
   a bridge,
   a proxy server, or
   an optical add-drop multiplexer (OADM).

5. The method of claim 1, where the network device includes a packet forwarding module.

6. The method of claim 1, where the host component includes a component that exchanges topology information with other network devices.

7. The method of claim 1, where, when the traffic is host bound traffic, the traffic includes one or more of:
   data link layer traffic,
   network layer traffic,
   protocol traffic, or
   control traffic.

8. The method of claim 1, where the network device includes a firewall filter.

9. The method of claim 1, further comprising:
   receiving, from the user, one or more changes to the classification scheme; and
   changing the classification scheme based on the one or more changes.

10. The method of claim 1, where the classification scheme is based on default classifications that are pre-configured in the network device.

11. A network device comprising:
    one or more processors to:
    receive traffic,
       determine whether the traffic is host bound traffic or non-host bound traffic,
       determine, based on a classification scheme defined by a user of the network device, a classification of the traffic when the traffic is host bound traffic,
       determine, when the traffic is host bound traffic, that a bandwidth is unavailable for forwarding the traffic to a host component of the network device,
       assign, based on the classification, the traffic to a queue of a plurality of queues based on determining that the bandwidth is unavailable for forwarding the traffic to the host component of the network device,
       determine that a different bandwidth is available for forwarding different traffic to the host component, and
       forward the different traffic to the host component, without assigning the different traffic to any queue of the plurality of queues, based on determining that the different bandwidth is available for forwarding the different traffic to the host component.

12. The network device of claim 11, where the one or more processors are further to:
    forward the traffic to an output port when the traffic is non-host bound traffic.

13. The network device of claim 11, where the one or more processors are further to:
    forward, after assigning the traffic, the traffic from the queue to the host component when the bandwidth becomes available.

14. The network device of claim 11, where, when assigning the traffic, the one or more processors are to:
    determine a priority of the traffic based on the classification,
    select the queue based on the priority of the traffic, and
    assign the traffic to queue after selecting the one of the plurality of queues.

15. The network device of claim 11, where the host component includes a component that routes the traffic.

16. The network device of claim 11, where the one or more processors are further to:
    receive, from the user, one or more changes to the classification scheme, and
    change the classification scheme based on the one or more changes.

17. The network device of claim 11, where the classification scheme is based on default classifications that are pre-configured in the network device.

18. A non-transitory computer-readable medium storing instructions, the instructions comprising:
    one or more instructions that, when executed by at least one processor of a network device, cause the at least one processor to:
    receive traffic,
       determine whether the traffic is host bound traffic or non-host bound traffic,
       forward the traffic to an output port when the traffic is non-host bound traffic,
       determine, based on a classification scheme defined by a user of the network device, a classification of the traffic when the traffic is host bound traffic, determine, when the traffic is host bound traffic, whether a bandwidth is unavailable for forwarding the traffic to a host component of the network device, assign, based on the classification, the traffic to a queue of a plurality of queues when the bandwidth is unavailable, determine that a different bandwidth is available for forwarding different traffic to the host component, and forward the different traffic to the host component, without assigning the different traffic to any queue of the plurality of queues, based on determining that the different bandwidth is available for forwarding the different traffic to the host component.

19. The non-transitory computer-readable medium of claim 18, where the one or more instructions to determine whether the bandwidth is unavailable for forwarding the traffic includes:

one or more instructions that, when executed by the at least one processor, cause the at least one processor to:

determine a bandwidth availability associated with forwarding the traffic to the host component, and determine whether the bandwidth is unavailable for forwarding the traffic based on the bandwidth availability.

20. The non-transitory computer-readable medium of claim 18, where the instructions further comprise:

one or more instructions that, when executed by the at least one processor, cause the at least one processor to:

forward the traffic to the host component when the bandwidth is available.

\* \* \* \* \*

UNITED STATES PATENT AND TRADEMARK OFFICE
CERTIFICATE OF CORRECTION

| | |
|---|---|
| PATENT NO. | : 8,503,428 B2 |
| APPLICATION NO. | : 12/726687 |
| DATED | : August 6, 2013 |
| INVENTOR(S) | : Sandeep Bajaj et al. |

It is certified that error appears in the above-identified patent and that said Letters Patent is hereby corrected as shown below:

In the Claims:

Please correct claim 14 as follows:

Column 14, claim 14, line 42, after "traffic to" insert -- the --.

Signed and Sealed this
Seventeenth Day of September, 2013

Teresa Stanek Rea
*Deputy Director of the United States Patent and Trademark Office*